United States Patent [19]

Lazarus et al.

[11] 4,115,350
[45] Sep. 19, 1978

[54] PRODUCTION OF THERMALLY STABILIZED POLYESTER

[75] Inventors: Stanley David Lazarus, Petersburg; Kalidas Chakravarti, Richmond, both of Va.

[73] Assignee: Allied Chemical Corporation, Morris Township, Morris County, N.J.

[21] Appl. No.: 819,654

[22] Filed: Jul. 27, 1977

[51] Int. Cl.$^2$ .................. C08K 5/04; C08G 63/70; C08G 63/76
[52] U.S. Cl. .................. 260/45.8 A; 260/22 E P; 264/210 F; 264/211; 528/273
[58] Field of Search .......... 260/22 EP, 45.8 A, 75 T, 260/75 EP, 75 N

[56] References Cited
U.S. PATENT DOCUMENTS

| | | | |
|---|---|---|---|
| 3,650,997 | 3/1972 | Weisfeld et al. | 260/22 EP X |
| 3,673,144 | 6/1972 | Weissermel et al. | 260/75 EP X |
| 3,886,104 | 5/1975 | Borman et al. | 260/22 EP |
| 3,985,705 | 10/1976 | Georgoudis | 260/45.8 A |
| 4,016,142 | 4/1977 | Alexander et al. | 260/75 T |

*Primary Examiner*—Lucille M. Phynes
*Attorney, Agent, or Firm*—Fred L. Kelly

[57] ABSTRACT

High molecular weight linear condensation polyesters are stabilized against deterioration by heat by reacting the polyester in molten form with an epoxy compound having 5 to 25 carbon atoms in the molecule and selected from the group consisting of

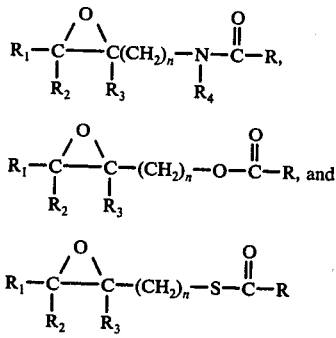

where R represents the radical remaining after removal of the carboxyl group from a monocarboxylic acid, $R_1$, $R_2$, $R_3$ and $R_4$ represent hydrogen or hydrocarbon radicals, and n is an integer that can be 0 to 3.

11 Claims, No Drawings

PRODUCTION OF THERMALLY STABILIZED POLYESTER

CROSS-REFERENCE TO RELATED APPLICATION

This application is related to our copending application Ser. No. 806,988 filed June 16, 1977.

BACKGROUND OF THE INVENTION

1. Field of the Invention

This invention relates to a heat stable fiber forming polyester and to a new and novel process for preparing it. More particularly, this invention relates to an improved linear high molecular weight heat stable polyester especially suitable for preparing fibers which have excellent resistance to degradation when utilized in commercial articles, such as tires, industrial belting, etc. wherein a high degree of heat is built up during use.

2. Description of the Prior Art

High molecular weight polyethylene terephthalate fiber forming polyesters are well known. They are prepared commercially either by the ester interchange reaction between dimethyl terephthalate and ethylene glycol or by the direct esterification process wherein terephthalic acid is reacted directly with ethylene glycol. These products and processes are well documented in U.S. patents, such as Nos. 2,465,310; 3,050,533; 3,051,212; 3,427,287 and 3,484,410 which cover not only the basic products and processes but many improvements thereon.

Polyethylene terephthalate fibers and cords are known to exhibit excellent dimensional stability, that is, low extension or growth during service, as well as to have a high resistance to thermal degradation; however, in pneumatic tires and industrial belts under high speed conditions under heavy load, loss of tensile strength is experienced due to high temperature conditions emanating under such conditions. Efforts to remedy this problem have all too often been ineffective. Most research in this field has been directed to producing a high molecular weight linear polyester having a low content of free carboxyl groups. The following patents are pertinent.

U.S. Pat. No. 3,051,212 to William W. Daniels relates to reinforced rubber articles and to textile cords and fibers for reinforcing such articles. This patent discloses that a linear terephthalate polyester having a concentration of free carboxyl groups of less than 15 equivalents per million grams may be prepared in a number of different ways. One effective procedure is to treat the filaments, after they have been formed, with a chemical reagent which reacts with and "caps" the free carboxyl group. One such agent is diazomethane.

U.S. Pat. No. 3,627,867 to Eckhard C. A. Schwarz discloses a process and apparatus for melt spinning high molecular weight polyethylene terephthalate into high-performance fibers under conditions which reduce the normally high viscosity of such polyester. Ethylene oxide or other low-boiling oxirane compound is injected under pressure into molten polyester before it is fed to the metering pump of the melt-spinning machine. The fibers are characterized by low free-carboxyl content and freedom from voids which might be expected from injection of the volatile material.

U.S. Pat. No. 3,657,191 to Rudolph Titzmann et al. is directed to a process for the manufacture of linear polyesters having an improved stability with respect to compounds with active hydrogen. Polyesters of this type are obtained by reacting polyesters with ethylene carbonates or monofunctional glycidyl ethers. The reaction is first carried out within a temperature range lying 10° to 60° C. below the softening point of the polyester and is then terminated during the melting and melt-spinning process.

U.S. Pat. No. 3,869,427 to Robert W. Meschke et al. discloses a process of preparing polyester filaments having low free-carboxyl-group contents which give superior performance in pneumatic tires and other reinforced rubber articles where heat-degradation is a problem. Reduction of free carboxyl groups is achieved by mixing with the molten polyester, prior to melt-spinning, 1,2-epoxy-3-phenoxypropane or 1,2-epoxy-3-n-hexyloxypropane.

U.S. Pat. No. 4,016,142 to William Alexander et al. discloses preparation of a fiber-forming polyester wherein the number of free carboxyl end groups present in the polymer may be reduced by adding to the polymerized polyester a glycidyl ether which reacts with the carboxyl end groups present to form free hydroxyl end groups.

Although the above-identified patents directed to stabilized polyesters are of major interest, certain of the proposed polyester modifiers are known to be highly toxic and/or hazardous to use on commercial scale. Moreover, we have found that the others are relatively less effective in terms of reducing the carboxyl end group concentration of the polyester. Accordingly, we have carried out considerable research in this field to solve or mitigate the long-standing problem of producing high molecular weight polyester stabilized against deterioration under high temperature operating conditions.

SUMMARY OF THE INVENTION

The present invention relates to an improved high molecular weight heat stable polyester and to a novel process for preparing it. The invention further provides polyester fibers which have excellent resistance to thermal degradation when utilized in commercial articles, such as tires, industrial belting, etc. wherein a high degree of heat is built up during use.

In accordance with the above objects, it has now been discovered that an improved heat stable fiber forming linear condensation polyester is obtained by incorporating therein a stabilizing amount of a stabilizer comprising an epoxy compound having 5 to 25 carbon atoms in the molecule and selected from the group having the formulae:

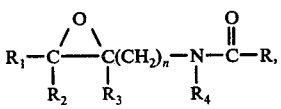

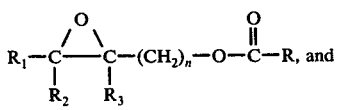

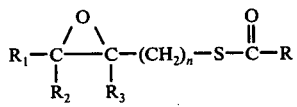

where R represents the radical remaining after removal of the carboxyl group from a monocarboxylic acid, $R_1$, $R_2$, $R_3$ and $R_4$ represent hydrogen or hydrocarbon radicals, and $n$ is an integer that can be 0 to 3. This novel polyester is obtained without undue difficulties in the processing thereof and the additive is compatible with other additives that may be desirable for specific uses. Preferably, the polyester in molten form is reacted with the epoxy compound, whereby the resulting thermally stabilized polyester has a free carboxyl concentration of less than 15 gram equivalents of carboxyl groups per $10^6$ grams of polyester.

The epoxy compounds useful as stabilizers in the present invention are known compounds or are readily prepared by known procedure. In particular, amides of epoxyamines and carboxylic acids and the preparation thereof are described in U.S. Pat. No. 2,730,531 to George R. Payne et al., and U.S. Pat. No. 2,772,296 to Albert C. Mueller discloses a process for preparing epoxy esters, e.g., glycidyl benzoate is prepared by reacting benzoic acid with epichlorohydrin. The corresponding glycidyl thiobenzoate may be prepared from thiobenzoic acid.

The preparation of the improved polyester can be carried out by condensing an aromatic dicarboxylic acid, preferably terephthalic acid, and/or the lower alkyl ester thereof with a glycol containing 2 to about 10 carbon atoms per molecule under direct esterification and/or ester-interchange conditions. A stabilizing amount of the above-described stabilizer may be incorporated before, during or after polycondensation of the polyester. Preferably, the stabilizer is added to the molten polyester after the final polycondensation of the polymer.

The esterification of the aromatic dicarboxylic acid and/or the lower alkyl esters thereof and the glycol can start at a temperature as low as 200° C. and range up to 300° C. and at atmospheric and superatmospheric pressures ranging up to 500 psig. The reaction, either the direct esterification or ester-interchange is carried out in the absence of oxygen-containing gas. Preferably, the reaction temperature ranges from about 230° C. to about 280° C. and at a pressure ranging from about 50 to 250 psig. The reaction time will vary depending upon the reaction temperature and pressure. The glycol is reacted with the aromatic dicarboxylic acid and/or the lower alkyl ester thereof in an amount ranging from about 1 to about 3 mols of glycol per mol of acid. The amount of said epoxy compound added as stabilizer ranges generally from 5 to 70 gram mols of epoxy compound per $10^6$ grams of the polyester. Preferably, 10 to 50 gram mols of epoxy compound is added per $10^6$ grams of the polyester.

Other additives can be added to the polymer with complete compatibility therewith to control or tailor the reactions in order to obtain required characteristics of the final polymer for specific end uses. Many such additives are known and utilized to control dyeing, static, luster, flammability, light stability, brightness, etc.

The polycondensation of the esterification product obtained by the direct esterification or ester-interchange reaction between aromatic dicarboxylic acid or lower alkyl ester thereof with a glycol is usually carried out at a reduced pressure which can be as low as 0.1 torr and a temperature in the range of from about 260° C. to about 300° C. This part of the reaction is carried out under these conditions for periods of about 1.0 to about 10 hours and preferably from about 2 to about 6 hours until a polymerized polyester product of the required molecular weight as determined by viscosity or other convenient physical measures is obtained. The duration of such periods depends upon the various process polymerization conditions such as pressure and temperature profiles, ingredient mol ratios, surface generation conditions, catalyst type and concentration, any additives utilized, requisite viscosity, etc. Polycondensation is generally continued until the resultant polyester has an intrinsic viscosity in 60 percent phenol-40 percent tetrachloroethane mixture of about 0.6 to 1.0, preferably 0.8 to 0.95.

DESCRIPTION OF THE PREFERRED EMBODIMENTS

As previously mentioned, the present invention further provides polyester fibers which have excellent resistance to degradation when utilized in commercial articles, such as tires, industrial belting, etc. wherein a high degree of heat is built up during use. Accordingly, one preferred embodiment of this invention may be briefly stated as follows:

In the preparation of fibers particularly useful in reinforced rubber articles such as pneumatic tires and industrial belts, from high molecular weight linear terephthalate condensation polyester, the method of providing a reduction in the free carboxyl content of the polyester to a carboxyl concentration of less than 15 gram equivalents per $10^6$ grams of polyester which comprises adding to the polyester after final polycondensation of the polyester a thermally stabilizing amount of a stabilizer comprising an epoxy compound selected from the group having the formulae:

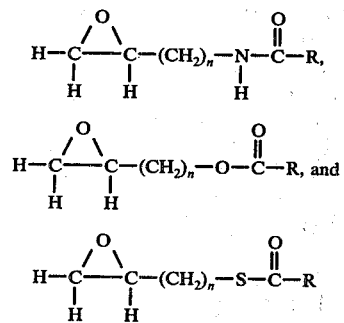

where R represents the radical remaining after removal of the carboxyl group from a monocarboxylic acid and $n$ is an integer that can be zero or one, said epoxy compound having 5 to 20 carbon atoms in the molecule. Preferably, 10 to 50 gram mols of said epoxy compound are added to the polyester per $10^6$ grams of the polyester.

The following examples are illustrative of embodiments of the present invention but are not to be construed as limiting the invention in any way. The ingredient parts are expressed as stated in the examples.

EXAMPLE 1

About 41.5 pounds per hour of terephthalic acid, 27.9 pounds per hour of ethylene glycol, 65 grams per hour of diisopropylamine and 16 grams per hour of antimony acetate are continuously fed to a paddle mixer where they are converted to a paste. The paste mixture is then pumped from the mixer by a feed pump to the inlet of a circulating pump. The paste mixture is pumped with 40 parts by weight per part of past mixture of recirculating mixture by the circulating pump through a multiple tube and shell heat exchanger where it is heated to 260°-270° C. After leaving the heat exchanger, the mixture enters an esterification reactor which is maintained at 260°-270° C. by conventional heating means, and 90 psig. pressure by means of an automatic vent valve. The recirculating mixture leaving this reactor is split, with part being returned to the inlet of the circulating pump where it is combined with fresh paste and part flowed to a series of three reactors where further esterification takes place at 270°-275° C. Total esterification time is about 3 hours. Following esterification the reaction mixture is fed into a polycondensation reactor operating at 275° C. and 30 torr pressure, with a residence time of 60 minutes. The resulting polyester polymer is fed to a polycondensation reactor operating at 275° C. and 2 torr pressure, with a residence time of 120 minutes. Then, the polyester polymer is processed in a final polycondensation at 278° C. and 0.5 torr pressure for 130 minutes. The polyester polymer melt at about 278° C. is pumped from the final polycondensation reactor by means of a screw pump and conducted to gear pumps for transfer to a spinning machine where polymer temperature is increased to about 300° C. Between the screw pump and the gear pump, 0.255 pound per hour of N-(2,3 epoxypropyl)-benzamide is added to the polyester polymer as stabilizer and intimately mixed with the polymer by means of a conventional stationary mixer. The polyester polymer is reacted with the N-(2,3 epoxypropyl)-benzamide for 3-20 minutes at about 278° to 300° C. until the polymer is spun at the rate of 48 pounds per hour through a 192 hole spinnerette. Yarn is continuously spun and drawn to form 1300 denier, 192 filament yarn. The undrawn yarn from the spinnerette has an intrinsic viscosity of 0.80 to 0.90 dl. per gram and about 12 gram equivalents of carboxyl end groups per $10^6$ grams of polyester. The drawn yarn has 15.9 percent ultimate elongation and 8.5 grams per denier tensile strength. The drawn yarn retains 87 percent of its strength after exposure to pure ammonia gas for 3 hours at 150° C. This test shows that the yarn is very stable to both heat and ammonia, which is indicative of a good tire yarn. The drawn yarn is overfinished with a lubricating composition, twisted into 3 ply, 9 t.p.i. tire cord, woven into a fabric, dipped in a blocked diisocyanate-epoxide emulsion, stretched at 420° F., dipped in a resorcinol-formaldehyde-vinyl pyridine polymer emulsion, stretched at 440° F., and calendered with rubber to make rubberized fabric for tire building. Tires made with this fabric are characterized by excellent durability when run on the wheel test stand.

Similar results are obtained when equivalent amounts of N-(2,3 epoxypropyl)-stearamide, N-(epoxyethyl)-benzamide, glycidyl benzoate or S-(glycidyl)-thiobenzoate are used in place of the N-(2,3 epoxypropyl)-benzamide.

EXAMPLE 2

This example demonstrates the use of 4-dimethylaminopyridine as a catalyst to accelerate the reaction of polyethylene terephthalate with an epoxy compound of the present invention.

About 48 pounds of polyethylene terephthalate chips having an intrinsic viscosity of 0.95 are mixed with 0.255 pound of N-(2,3 epoxypropyl)-benzamide and 0.01 pound of 4-dimethylaminopyridine by tumbling in a can. The mixture is then melted and spun at about 300° C. through a 1-inch extruder into 48 filament yarn which is plied and drawn at a draw ratio of 6.05 to 1 into 1300 denier, 192 filament yarn. The undrawn yarn from the spinnerette has an intrinsic viscosity of 0.84 and 9 equivalents of carboxyl end groups per $10^6$ grams. The drawn yarn has 14.5 percent ultimate elongation and tensile strength of 8.4 grams per denier. The drawn yarn retains 90 percent of its strength after exposure to pure ammonia gas for 3 hours at 150° C. This yarn is converted into tire cord as in the first example. The cord is characterized as having excellent fatigue and durability properties.

EXAMPLE 3

Example 1 is repeated except that 0.51 pound per hour of N-(2,3 epoxypropyl)-benzamide is added to 48 pounds per hour of the polyester polymer. The undrawn yarn from the spinnerette has an intrinsic viscosity of 0.80 to 0.90 and about 5 equivalents of carboxyl end groups per $10^6$ grams of polyester. The drawn yarn has 17.3 percent ultimate elongation and tensile strength of 8.1 grams per denier. The drawn yarn retains 96 percent of its strength after exposure to pure ammonia gas for 3 hours at 150° C.

EXAMPLE 4 (Comparative)

Example 1 is repeated except that no N-(2,3-epoxypropyl)-benzamide is added to the polyester polymer. The undrawn yarn from the spinnerette has an intrinsic viscosity of 0.80 to 0.90 and 30 equivalents of carboxyl end groups per $10^6$ grams of polyester. The drawn yarn has 16.7 percent ultimate elongation and tensile strength of 8.2 grams per denier. The drawn yarn retains only 59 percent of its strength after exposure to pure ammonia gas for 3 hours at 150° C. These data in comparison with the data of Examples 1-3 demonstrate the beneficial effect respecting number of carboxyl end groups and strength retention of the polyester yarn of adding the stabilizer compound of the present invention.

EXAMPLE 5 (Comparative)

To demonstrate the criticalness of using the particular epoxy compounds of the present invention, Example 1 is repeated except that equivalent amounts of 4-methoxyphenyl-2,3-epoxypropyl ether, phenyl-2,3-epoxypropyl ether or $C_8 + C_{10}$ n-alkyl epoxypropyl ethers are used in place of the N-(2,3 epoxypropyl)-benzamide of Example 1. The undrawn yarn from the spinnerette has an intrinsic viscosity of 0.85 and 27-29 equivalents of carboxyl end groups per $10^6$ grams of polyester. The drawn yarn is similar in properties to that produced in comparative Example 4.

Although we do not wish to be bound by any theory as to the mechanism of the present invention, we believe that the activity of the epoxy compounds of the present invention relates to the structure of the overall molecule and particularly to the position of the carbonyl oxygen with respect to the epoxy oxygen.

The proposed mechanism for the present invention is illustrated below with a typical epoxy compound of the invention, glycidyl benzoate.

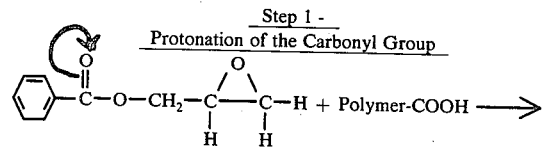

-continued
Step 1 -
Protonation of the Carbonyl Group

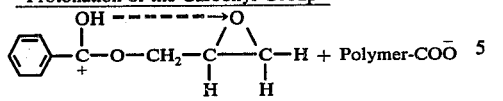

Step 2
Formation of Cyclic Hydrogen Bonded Intermediate from the Protonated Carbonyl and Oxirane Groups

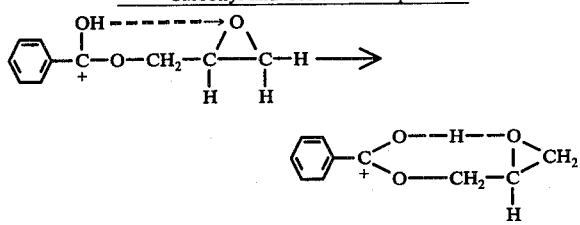

Step 3 -
Formation of Intermediate Protonated Oxirane Group and Reformation of Carbonyl Group

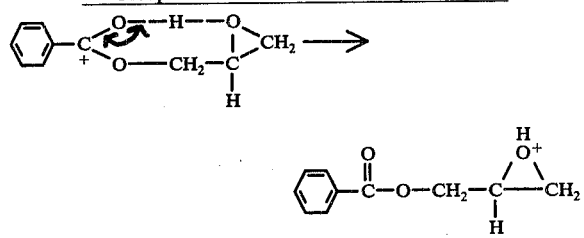

Step 4 -
Nucleophillic Attack of Polymeric Carboxylate Anion (from Step 1) on Protonated Oxirane Group

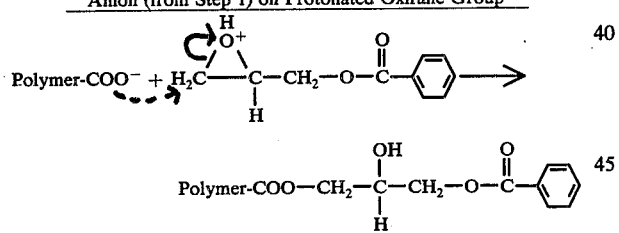

We have found that optimum activity of the epoxy compounds of the present invention results when there are 3 to 4 atoms between the epoxy oxygen and the carbonyl oxygen. This corresponds to 6 or 7 atoms in the above-described cyclic intermediates.

We claim:

1. A thermally stabilized high molecular weight linear terephthalate condensation polyester having incorporated therein a thermally stabilizing amount of a stabilizer consisting of an epoxy compound having 5 to 25 carbon atoms in the molecule and selected from the group having the formula

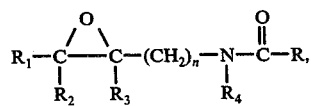

where R represents the radical remaining after removal of the carboxyl group from a monocarboxylic acid, $R_1$, $R_2$, $R_3$ and $R_4$ represent hydrogen or hydrocarbon radicals, and n is an integer that can be 0 to 3, said thermally stabilized polyester having a free carboxyl concentration of less than 15 gram equivalents of carboxyl groups per $10^6$ grams of polyester.

2. The polyester of claim 1 wherein the linear terephthalate condensation polyester is polyethylene terephthalate.

3. The polyester of claim 1 wherein 5 to 70 gram mols of said epoxy compound is incorporated per $10^6$ grams of the polyester.

4. The polyester of claim 1 wherein 10 to 50 gram mols of said epoxy compound is incorporated per $10^6$ grams of the polyester.

5. The polyester of claim 1 additionally containing a catalytic amount of 4-dimethylaminopyridine.

6. In a process for the preparation of a high molecular weight linear terephthalate condensation polyester wherein terephthalic acid is reacted with a glycol containing 2 to 10 carbon atoms per molecule under esterification conditions and the resulting esterification product is polycondensed, the improvement which comprises providing a reduction in the free carboxyl content of the polyester to a carboxyl concentration of less than 15 gram equivalents per $10^6$ grams of polyester by adding to the polyester after final polycondensation of the polyester a thermally stabilizing amount of a stabilizer comprising an epoxy compound having 5 to 25 carbon atoms in the molecule and selected from the group having the formula

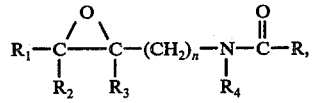

where R represents the radical remaining after removal of the carboxyl group from a monocarboxylic acid, $R_1$, $R_2$, $R_3$ and $R_4$ represent hydrogen or hydrocarbon radicals, and $n$ is an integer from 0 to 3.

7. The process of claim 6 wherein the linear terephthalate condensation polyester is polyethylene terephthalate.

8. The process of claim 6 wherein 5 to 70 gram mols of said epoxy compound is incorporated per $10^6$ grams of the polyester.

9. The polyester of claim 6 wherein 10 to 50 gram mols of said epoxy compound is incorporated per $10^6$ grams of the polyester.

10. The process of claim 6 wherein said epoxy compound is added to the polyester together with a catalytic amount of 4-dimethylaminopyridine.

11. In the preparation of tire yarn from a linear polyethylene terephthalate condensation polyester by melt spinning, the method of providing a reduction in the free carboxyl content of the polyester to a carboxyl concentration of less than 15 gram equivalents per $10^6$ grams of polyester which comprises adding to the polyester after final polycondensation of the polyester a thermally stabilizing amount of a stabilizer comprising an epoxy compound having 5 to 25 carbon atoms in the molecule and selected from the group having the formula

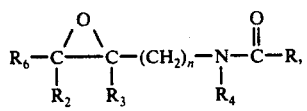
where R represents the radical remaining after removal of the carboxyl group from a monocarboxylic acid, $R_1$, $R_2$, $R_3$ and $R_4$ represent hydrogen or hydrocarbon radicals, and $n$ is an integer from 0 to 3.
* * * * *